(12) United States Patent
Adwankar et al.

(10) Patent No.: US 7,836,095 B2
(45) Date of Patent: Nov. 16, 2010

(54) METHOD, SYSTEM AND APPARATUS FOR DYNAMICALLY CREATING CONTENT CHANNEL BASED ON END USER WISH LISTS

(75) Inventors: Sandeep M. Adwankar, Buffalo Grove, IL (US); Anthony Carter, Naperville, IL (US); Thomas C. Hill, Crystal Lake, IL (US)

(73) Assignee: General Instrument Corporation, Horsham, PA (US)

( * ) Notice: Subject to any disclaimer, the term of this patent is extended or adjusted under 35 U.S.C. 154(b) by 578 days.

(21) Appl. No.: 11/558,087

(22) Filed: Nov. 9, 2006

(65) Prior Publication Data

US 2008/0115168 A1    May 15, 2008

(51) Int. Cl.
*G06F 17/30*    (2006.01)
*G06F 7/00*    (2006.01)
(52) U.S. Cl. ...................... 707/803; 707/693
(58) Field of Classification Search .............. 707/104.1, 707/803, 693
See application file for complete search history.

(56) References Cited

U.S. PATENT DOCUMENTS 6,925,469 B2 * 8/2005 Headings et al. ............ 707/102

2003/0018745 A1 * 1/2003 McGowan et al. .......... 709/217
2003/0110503 A1 * 6/2003 Perkes ......................... 725/86
2006/0095516 A1    5/2006 Wijeratne

FOREIGN PATENT DOCUMENTS

WO    WO 2004/084444 A    9/2004

OTHER PUBLICATIONS

EPC Extended Search Report, Re: Application #07864016.6-1241/2082307; PCT/US2007/083881 Nov. 4, 2009.

* cited by examiner

*Primary Examiner*—Kuen S Lu
(74) *Attorney, Agent, or Firm*—Stewart M. Wiener

(57) ABSTRACT

A system (10), apparatus (12) and method (40) for providing content channels to end users based on end user wish lists. The method includes a domain channel manager apparatus accessing a plurality of end user wish lists maintained at end user devices, such as end user residential gateways and home servers. The domain channel manager accesses the plurality of wish lists and aggregates the wish list items, organizing and ranking the wish list items if necessary. Based on the aggregated wish list items from the plurality of end users, the domain channel manager retrieves content from all available content sources, such as content providers and existing content repositories. The domain channel manager creates content channels based on the retrieved content and offers those content channels to end users whose preferences match the content of the particular channel offered.

22 Claims, 2 Drawing Sheets

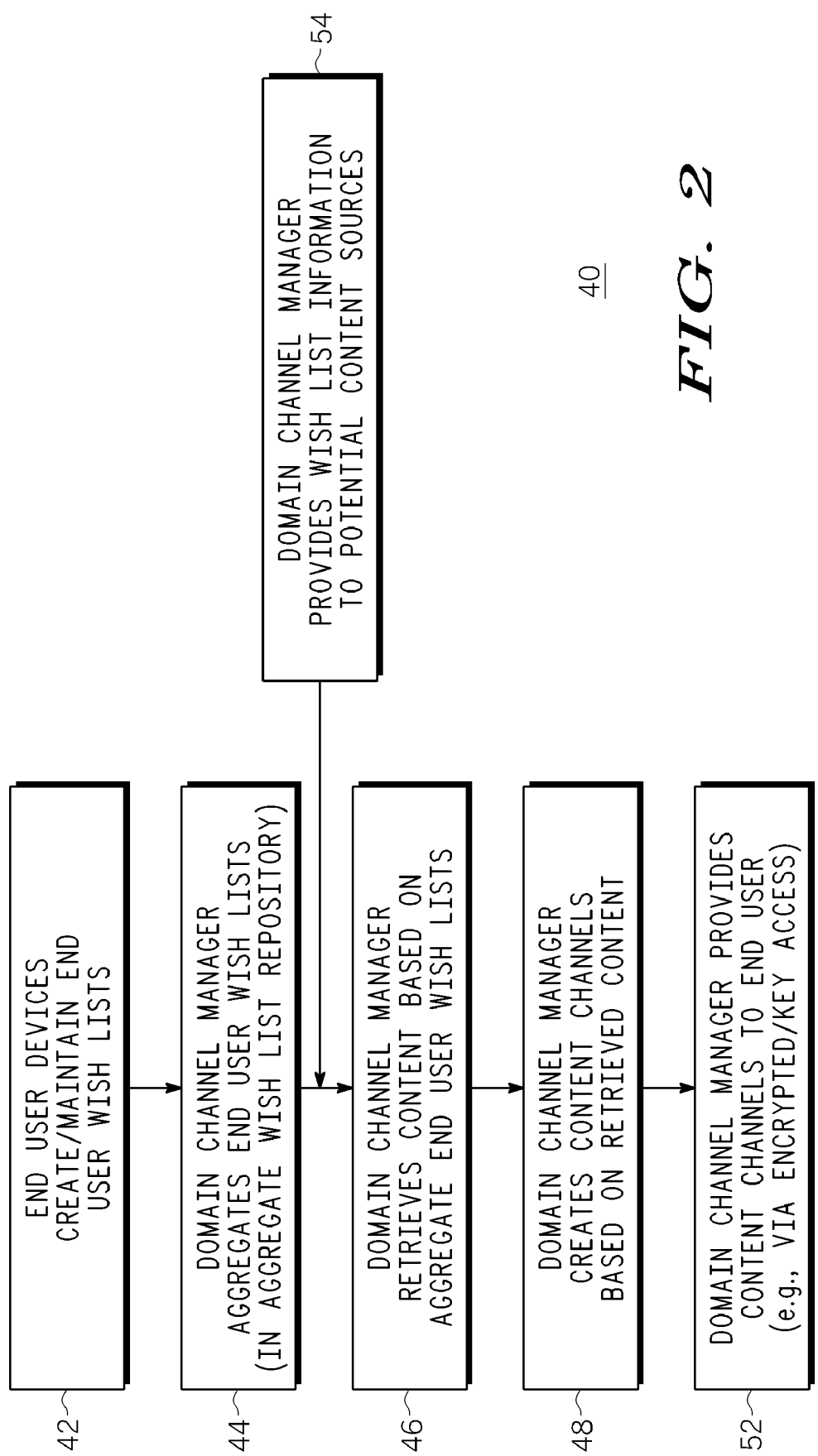

METHOD, SYSTEM AND APPARATUS FOR DYNAMICALLY CREATING CONTENT CHANNEL BASED ON END USER WISH LISTS

BACKGROUND OF THE INVENTION

1. Field of the Invention

The invention relates to providing content channels to consumer end users. More particularly, the invention relates to methods, apparatus and systems for providing content channels to consumer end users based on consumer end user wish lists.

2. Description of the Related Art

Many conventional systems and methods for providing digital content and other content from content suppliers or service providers to consumer end users involve a fixed or non-dynamic number of content sources to which the end user can subscribe or otherwise have access. For example, for video content, there usually are a fixed number of channels provided by a content service provider to which end users can subscribe to receive content.

Additional content provider services, such as video-on-demand and other pay-per-view services, have increased the number of available content selections or channels from which consumer end users can choose. However, even with the availability of such additional services, conventional systems still only offer content in a fixed, non-dynamic form. Also, the available choices from which consumer end users can choose often is determined in a manner other than by direct consumer end user preference. For example, the availability of certain content may be determined based on trends in popular culture, limited viewer polls, or on the previous success of similar content.

Digital video recording services, such as TiVo®, offer consumer end users the ability to find and record one or more occurrences of a show offered by a particular content provider according to the consumer end user's "wish list" selection criteria. For example, a consumer can have their digital video recording service find and record occurrences of a particular television program or all programs starring a particular actor available on any channel offered by the end user's content service provider. However, such ability still is limited by the available content selection of the content service provider. Also, such content selection still only provides a fixed, non-dynamic number of content channels or selections from which to choose. Moreover, the content available from the content service provider often is not determined by or based on consumer end user preference.

BRIEF DESCRIPTION OF THE DRAWINGS

FIG. 2 is a flow chart that schematically illustrates a method for providing content channels to end users based on end user wish lists.

DETAILED DESCRIPTION

Figure 1:
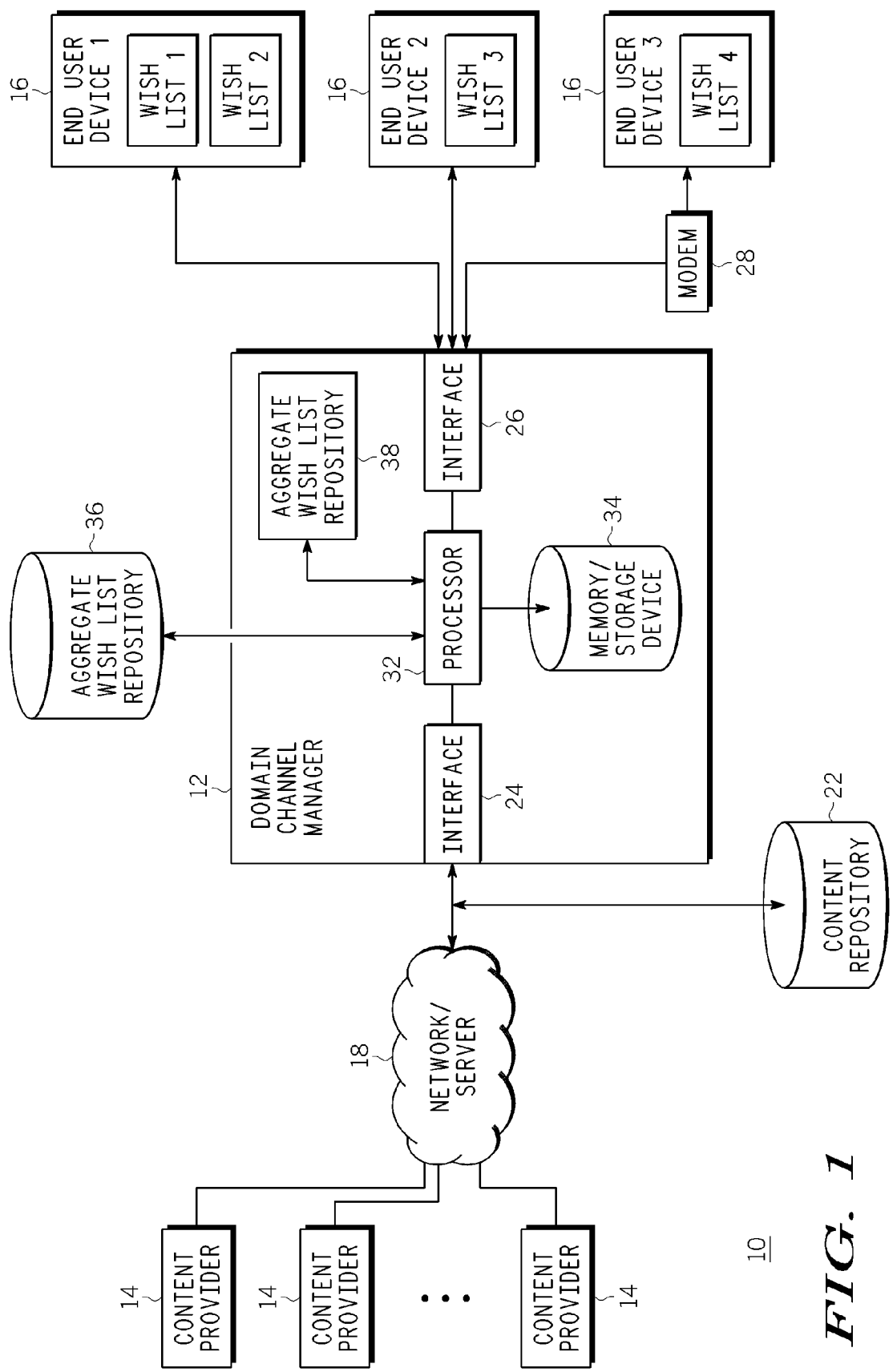
FIG. 1 is a block diagram of a system for providing content channels to end users based on end user wish lists, including a domain channel manager apparatus.

In the following description, like reference numerals indicate like components to enhance the understanding of the method, system and apparatus for providing content channels based on end user wish lists through the description of the drawings. Also, although specific features, configurations and arrangements are discussed hereinbelow, it should be understood that such specificity is for illustrative purposes only. A person skilled in the relevant art will recognize that other steps, configurations and arrangements are useful without departing from the spirit and scope of the invention.

Referring now to FIG. 1, shown is a block diagram of a system 10 for providing content channels to end users based on end user wish lists. The system 10 includes a domain channel manager 12, a plurality of content providers 14 and a plurality of subscriber or consumer end user devices 16. The domain channel manager 12 can be coupled to the plurality of content providers 14 via a network/server 18, such as an Internet protocol (IP) network or other suitable network arrangement or server arrangement. Also, a content repository 22 can be coupled to the domain channel manager 12 and/or the network/server 18, as shown generally.

The domain channel manager 12 includes a first interface 24 that couples the domain channel manager 12 to the network/server 18 and the content repository 22 in any suitable manner. The domain channel manager 12 also includes a second interface 26 that couples the domain channel manager 12 to the plurality of end user devices 16 in any suitable manner, e.g., via a cable modem 28 or other suitable connection, including a wireless connection.

The domain channel manager 12 includes a processor 32 and a memory or storage unit 34 coupled to the processor 32. The processor 32 is coupled between the first interface 24 and the second interface 26. As will be discussed in greater detail hereinbelow, an aggregate wish list repository or aggregate metadata wish list repository is coupled to the processor 32. As shown generally, the aggregate wish list repository can be external to the domain channel manager 12 (shown as repository 36) or can be contained within the domain channel manager 12 (shown as repository 38).

One or more of the processor 32 and the memory or storage unit 34 can be comprised partially or completely of any suitable structure or arrangement, e.g., one or more integrated circuits. Also, it should be understood that the domain channel manager 12 includes other components, hardware and software (not shown) that are used for the operation of other features and functions of the domain channel manager 12 not specifically described herein.

In general, the processor 32 controls the overall operation of the domain channel manager 12, including the ability of the domain channel manager 12 to receive and aggregate a plurality of end user wish lists from the end user devices 16, and retrieve content from a plurality of content sources based on the aggregated wish lists, as will be discussed in greater detail hereinbelow. The memory or storage unit 34 can be any suitable memory device, including random access memory (RAM), read-only memory (ROM) and Flash memory devices. In general, the memory 34 stores logic, processing instructions and other information and data for the processor 32 (and other device components) to access.

The domain channel manager 12 can be partially or completely configured in the form of hardware circuitry and/or other hardware components within a larger device or group of components. Alternatively, the domain channel manager 12 can be partially or completely configured in the form of software, e.g., as processing instructions and/or one or more sets of logic or computer code. In such configuration, the logic or processing instructions typically are stored in a data storage device, such as the memory or storage unit 34, which typically is coupled to a processor or controller, such as the processor 32. The processor accesses the necessary instructions from the data storage device and executes the instructions or transfers the instructions to the appropriate location within the device.

As will be understood from additional discussion hereinbelow, the consumer end user devices 16 can be partially or completely any suitable device or subsystem (or portion thereof) for generating and maintaining end user wish lists. Such devices can include, for example, any home networking device, any signal converter or decoder (set-top) box or other suitable computing device, including a residential gateway, a home media server system, a computer, a portable or mobile communication device, or an internet protocol (IP), satellite or cable digital video recorder. Each end user device 16 can be physically or virtually located at the location of the corresponding end user(s). Also, all or a portion of one or more of the end user devices 16 can be comprised of any suitable structure or arrangement, e.g., one or more integrated circuits.

As will be understood from additional discussion hereinbelow, the domain channel manager 12 can be partially or completely any suitable device or subsystem (or portion thereof) for, among other things, aggregating end user wish lists from the plurality of end user devices 16 and retrieving content from appropriate content sources, including one or more of the plurality of content providers 14 and/or the content repository 22. The domain channel manager 12 typically is located in a headend (not shown) or other suitable location within the system 10. The headend typically is a regional or local hub that is part of a larger service provider distribution system, such as a cable television distribution system. The headend typically is where programming from various sources is received, assigned to channels and retransmitted onto cables for delivery to consumers or subscribers.

The content providers 14 include any suitable source of content, including video content or other suitable form of content. Suitable content providers can include one or more of the following: a broadcast television service provider (e.g., a national or local television network) or distributor, a cable television service provider, an Internet service provider, a satellite broadcast system service provider, or other suitable service provider. Suitable content providers also can include any suitable web sites or other sources of content, such as a broadcast programming stream containing premium content and/or other content, a video server or other server containing Video-On-Demand (VOD) content and/or other content, and/or other suitable multimedia sources containing content including individual and personal content.

Content provided by one or more of the plurality of content providers 14 typically is in the form of a multimedia video stream comprised of a plurality of digital video signals formatted according to a suitable standard, such as the Moving Pictures Experts Group (MPEG) 2 or MPEG 4 standard, and multiplexed into a data stream that is modulated on a carrier using quadrature amplitude modulation (QAM) or other suitable modulation technique. Content is transmitted from the content providers 14 to the network/server 18, the domain channel manager 12 and/or the content repository 22 via any suitable network connection or system of network connections.

The content repository 22 can be any suitable device that can receive and store content, e.g., content received from one or more of the content providers 14. As discussed hereinabove, the content repository 22 is coupled to the domain channel manager 12 and/or the network/server 18. The content repository 22 can be physically or virtually located at the location of the domain channel manager 12 (e.g., the headend), the network/server 18 or other suitable location.

Referring now to FIG. 2, with continuing reference to FIG. 1, shown is a flow chart that schematically illustrates a method 40 for providing content channels to end users based on end user wish lists. The method 40 will be described along with the operation of the domain channel manager 12, the end user devices 16, the content providers 14, the content repository 22 and the aggregate wish list repository 36, 38.

The method 40 includes the step 42 of the plurality of end user devices 16 each maintaining one or more end user wish lists. As discussed hereinabove, each end user device 16 is a residential gateway, a home network server, a set-top box, a portable or mobile communication device or other end user device that is capable of allowing an end user to create and maintain a content wish list therein.

In general, an end user wish list contains a list and/or description of content desired by the end user. For example, an end user who may enjoy the work of a particular actor may create or have an existing wish list that includes a wish list item desiring all available films and other content associated with that particular actor. Alternatively, the same end user (or a different end user) may be a fan of a particular sports team and therefore may add or have an existing wish list entry that desires some or all upcoming games in which that team is to participate, replays of past games involving the team, audio commentary, team member information, and other available content related to the team. Additional wish list items can be added to the existing wish list or can be included as part of a new wish list.

The contents of the end user wish list can be in any suitable form. For example, the contents of an end user wish list can include metadata. In general, within the context of content, such as video content, metadata refers to information that describes data content in such a way that the data can be catalogued, indexed, archived and/or retrieved at some future date. In the system 10, the end user devices 16 create and maintain metadata associated with the contents of their respective wish lists.

It should be understood that the wish list of a single end user can include one or more different content requests or desires, e.g., a desire for the work of a particular actor and all available content associated with a particular sports team. Also, it should be understood that a single end user can create and maintain more than one wish list and that a single end user device 16 can include the wish lists of more than one end user.

The method 40 includes a step 44 in which the domain channel manager 12 aggregates the end user wish lists from the plurality of end user devices 16. The end user devices 16 can be configured to make the wish list information available only to the domain channel manager 12. The domain channel manager 12, which is coupled to the end user devices 16, has the ability to access the end user wish lists and aggregate their contents, e.g., in an aggregate wish list repository. As discussed hereinabove, the aggregate wish list repository can be external to the domain channel manager 12 (aggregate wish list repository 36) or an internal component of the domain channel manager 12 (aggregate wish list repository 38). Also, if the end user wish lists include metadata, the step 44 includes accessing metadata associated with the contents of the end user wish lists and aggregating the metadata, e.g., in the aggregate wish list repository.

As part of the step 44, the domain channel manager 12 can compare and/or synchronize the metadata or other wish list information obtained from the end user devices 16 with existing wish list information, e.g., in the aggregate wish list repository. For example, the domain channel manager 12 can update the existing wish list information in the aggregate wish list repository with the newly-acquired wish list information from the end user device wish lists, if necessary. Moreover, the domain channel manager 12 can rank the existing wish list information and, if desired, create a channel set or potential channel set based on the aggregated wish list information.

The method 40 includes a step 46 of the domain channel manager 12 retrieving content based on the aggregated wish list information. It should be understood that the domain channel manager 12 can retrieve content based on the aggregated wish list information in any suitable manner. The domain channel manager 12 can compare the aggregated wish list information with the content available from the plurality of content providers 14, and possibly other content sources. For example, a catalog or database of content available from the plurality of content providers 14 may reside at the network/server 18 or other suitable location within the system 10. The domain channel manager 12 can compare its aggregated content wish list information with the list of available content to determine which content to retrieve. Beyond availability, the domain channel manager 12 also can retrieve content based on any one or more of a number of factors, such as cost, size, source quality and reliability, and other suitable factors, including other factors that may be established or provided by one or more content providers. As part of the step 46, the domain channel manager 12 can compare its aggregated content wish list with previously-retrieved content, e.g., content contained in the content repository 22.

The method 40 includes a step 48 in which the domain channel manager 12 generates or creates one or more content channels from the retrieved content. The domain channel manager 12 creates channels based on the content retrieved by the domain channel manager 12, e.g., from the plurality of content providers 14, the content repository 22, and any other suitable sources from which the domain channel manager 12 is able to retrieve content.

The domain channel manager 12 can create a plurality of individual channels based on the retrieved content or, alternatively, create one or more sets of channels, i.e., channels sets, based on the retrieved content. For example, if the domain channel manager 12 has retrieved a sufficient amount of content relating to a particular aggregation of content wish list information, the domain channel manager 12 can create one or more content channels that include some or all of the retrieved content. If the amount of retrieved content is insufficient on which to base a content channel, the domain channel manager 12 can direct the retrieved content to the content repository 22 or other suitable location for possible subsequent retrieval.

The method 40 includes a step 52 of the domain channel manager 12 providing content channels to end users. Once the domain channel manager 12 creates content channels and/or channel sets, the domain channel manager 12 can offer the channels to end users or groups of end users, e.g., depending on the particular wish lists of the end users. For example, the domain channel manager 12 can offer one or more channels or channels sets for subscription to various end users. In this manner, the domain channel manager 12 can encrypt the channel content, e.g., using a domain key, and make it available for download to one or more end user devices 16. End users that subscribe to the channel receive the domain key, which allows them to decrypt the channel and access the content channel.

It should be understood that the domain channel manager 12, after creating content channels based on retrieved content, continues to search for newly-created content that can be provided on one or more of the created channels or be the basis for channels yet to be created. In this manner, the channels and the content of the channels can be dynamic and always evolving. For example, if a new documentary program about a particular actor is made available by one of the content providers 14, the domain channel manager 12 can include the documentary as part of a previously-created channel that offers movies and other works by the particular actor. Alternatively, the documentary can be part of a newly-created channel that involves the work of the particular actor.

Also, it should be understood that the domain channel manager 12 can discontinue (and subsequently recreate) previously-created channels in accordance with changing end user preferences. For example, if the domain channel manager 12 creates a channel that provides content relating to a particular sports team, the level of interest in that sports team my decline once the current season for that sports team is over. Therefore, prior to the start of the season, if sufficient end user interest exists (e.g., via end user wish lists), the domain channel manager 12 can create and offer one or more channels of content featuring the sports team. If, after the season is over, sufficient interest in the sports team fails to exist, the domain channel manager 12 can discontinue offering the channel, e.g., at least until sufficient interest exists again.

Unlike conventional content delivery systems and methods that offer a fixed number of channels or content selections from which an end user can choose, the method 40 retrieves or at least considers retrieving all available content based on an aggregation of end user wish lists, and creates channels and channel sets based on the retrieved content as it relates to the aggregated wish lists. The channels and/or channel sets offered to the end users can be offered based on aggregated wish lists and/or individual end user wish lists. For example, a channel that includes content associated with a particular sports team can be offered to all end users coupled to the domain channel manager 12 or, alternatively, only to selected end users whose wish lists include information showing at least a nominal level of interest in the particular sports team. In this manner, the method 40 creates and offers dynamic content channels that are based on the preferences or desires of end users via their wish lists.

The method 40 alternatively can include a step 54 of the domain channel manager 12 providing wish list information to potential content sources. For example, the domain channel manager 12 can publish or otherwise make available all or portions of the aggregated wish list information obtained from the end user wish lists to one or more potential content sources, e.g., non-traditional content sources, such as community groups, educators, artists, non-profit organizations and private residents. In response, the potential content sources can provide content to the domain channel manager 12 or make content available for the domain channel manager 12 to retrieve. Moreover, the additional content sources (as well as one or more of the content providers 14) can create entire channels or portions of channels using the specific content they provide. In this manner, a decentralized edge network is formed for content publishing where content gets created based on end user demand and preference. In such arrangements, the domain channel manager can act as an interface to route content securely to desired end users.

The method 40 allows end user preferences to dictate or determine the kind of channels that are made available, e.g., for subscription. Channel creation is dynamic and varies depending more directly on end user wish lists than convention systems and methods. End users typically are presented with channels that more directly match their preferences.

The method shown in FIG. 2 and described herein may be implemented in a general, multi-purpose or single purpose processor. Such a processor will execute instructions, either at the assembly, compiled or machine-level, to perform that process. Those instructions can be written by one of ordinary skill in the art following the description of the data traffic routing method described herein and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the method, apparatus and system for providing content channels based on end user wish lists herein described without departing from the spirit and scope of the invention as defined by the appended claims and their full scope of equivalents.

The invention claimed is:

1. A method for providing content to at least one end user, comprising the steps of:
    aggregating a plurality of content wish lists generated from at least one end user device, wherein the content wish list includes a list or description of content desired by an end user;
    retrieving, by a domain channel manager, content based on the aggregation of the plurality of content wish lists;
    generating, by the domain channel manager, at least one content channel based on the retrieved content, wherein the at least one content channel includes at least a portion of the retrieved content; and
    providing the at least one content channel to the at least one end user.

2. The method as recited in claim 1, wherein the retrieving step includes comparing the aggregation of the plurality of content wish lists with content available from a content repository.

3. The method as recited in claim 1, wherein the retrieving step includes retrieving content from at least one of a plurality of content sources and a content repository.

4. The method as recited in claim 3, further comprising the step of providing at least a portion of the aggregation of the plurality of content wish lists to at least one potential content source in such a manner that the potential content source can become one of the plurality of content sources.

5. The method as recited in claim 1, further comprising the step of creating a channel set based on the aggregation of the plurality of content wish lists, and wherein the retrieving step includes retrieving content based on the channel set.

6. The method as recited in claim 1, wherein at least a portion of at least one of the content wish lists has metadata associated therewith, wherein the aggregating step includes aggregating metadata associated with the plurality of content wish lists, and wherein the retrieving step includes retrieving content based on the aggregated metadata.

7. The method as recited in claim 1, further comprising the step of providing information to the end user based on the retrieved content in such a manner that the provided information can be used by the end user to update the end user content wish list.

8. The method as recited in claim 1, wherein the retrieving step includes retrieving content based on at least one of content price, content availability, content size and content source quality.

9. The method as recited in claim 1, wherein the providing step further comprises offering the content channel for sale or subscription to the end user.

10. The method as recited in claim 1, wherein the providing step includes encrypting at least a portion of the retrieved content being provided to the at least one end user and providing at least one decryption key to authorized end users for decrypting the encrypted content.

11. A domain channel manager apparatus for providing content to at least one end user, comprising:
    a storage unit for storing a plurality of content wish lists generated by at least one end user and received by the apparatus, wherein the content wish list includes a list or description of content desired by an end user; and
    a processor coupled to the storage unit and configured to aggregate the plurality of content wish lists,
    wherein the processor is configured to retrieve content based on the aggregation of the plurality of content wish lists,
    wherein the processor is configured to generate at least one content channel based on the retrieved content,
    wherein the at least one content channel includes at least a portion of the retrieved content, and
    wherein the processor is configured to provide the at least one content channel to the at least one end user.

12. The apparatus as recited in claim 11, wherein the processor is configured to retrieve content from at least one of a plurality of content sources coupled to the domain channel manager apparatus and a content repository coupled to the domain channel manager apparatus.

13. The apparatus as recited in claim 11, wherein the processor is configured to retrieve content based on the comparison of the aggregation of the plurality of content wish lists to content available from a content repository coupled to the domain channel manager apparatus.

14. The apparatus as recited in claim 11, wherein the processor is configured to provide the aggregation of the plurality of content wish lists to at least one potential content source coupled to the domain channel manager apparatus in such a manner that the potential content source can become one of the plurality of content sources.

15. The apparatus as recited in claim 11, wherein the processor is configured to create a channel set based on the aggregation of the plurality of content wish lists and to retrieve the content based on the channel set.

16. The apparatus as recited in claim 11, wherein at least a portion of at least one of the plurality of content wish lists has metadata associated therewith, and wherein the processor is configured to aggregate the metadata and retrieved content based on the aggregated metadata.

17. The apparatus as recited in claim 11, further comprising a wish list repository coupled to the processor for storing at least a portion of the aggregation of the plurality of content wish lists.

18. The apparatus as recited in claim 11, wherein the processor is configured to provide information to the end user based on the retrieved content in such a manner that the end user can update the end user content wish list.

19. The apparatus as recited in claim 11, wherein the processor is configured to retrieve content based on at least one of content price, content availability, content size, and content source quality.

20. The apparatus as recited in claim 11, wherein the processor is configured to provide the at least one content channel to the end user in such a manner that the at least one content channel is offered for sale or subscription to the end user.

21. The apparatus as recited in claim 11, wherein the processor is configured to encrypt at least a portion of the retrieved content provided to the at least one end user, and wherein the processor is configured to provide to authorized end users at least one decryption key for decrypting the encrypted content.

22. The apparatus as recited in claim 11, wherein the apparatus further comprises a device selected from the group consisting of a residential gateway device, a home media server, a signal converter box, a signal decoder box, a digital video disk recorder, a personal video recorder device, a computer, a personal digital assistant (PDA), a mobile communication device, an audio receiver and a video receiver.

* * * * *